June 14, 1927.
F. BAUER
1,632,641
RIGID AIRCRAFT
Filed Jan. 2, 1926
5 Sheets-Sheet 1
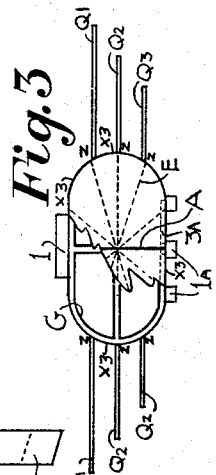
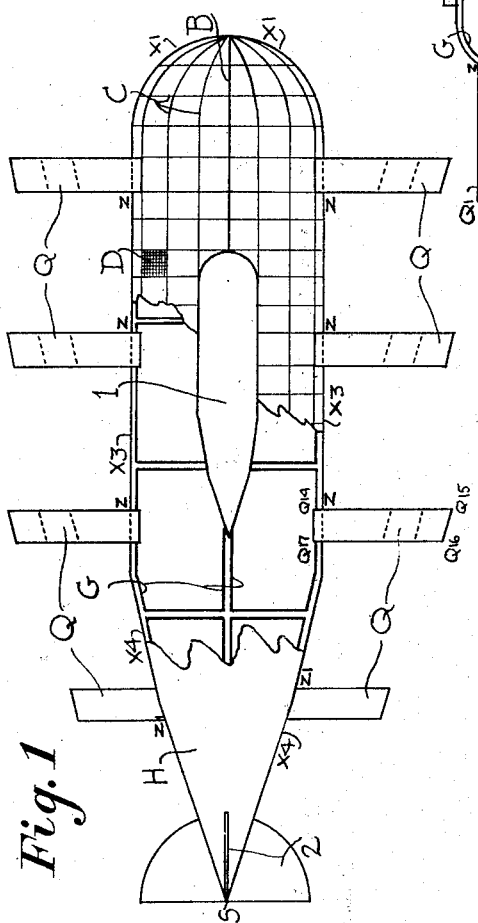
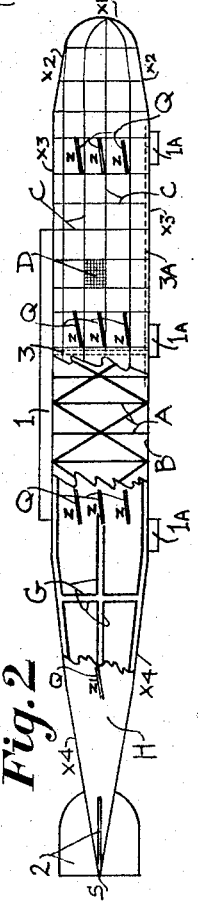
Frank Bauer Inventor June 14, 1927.                F. BAUER                    1,632,641
                           RIGID AIRCRAFT
                         Filed Jan. 2, 1926           5 Sheets-Sheet 2
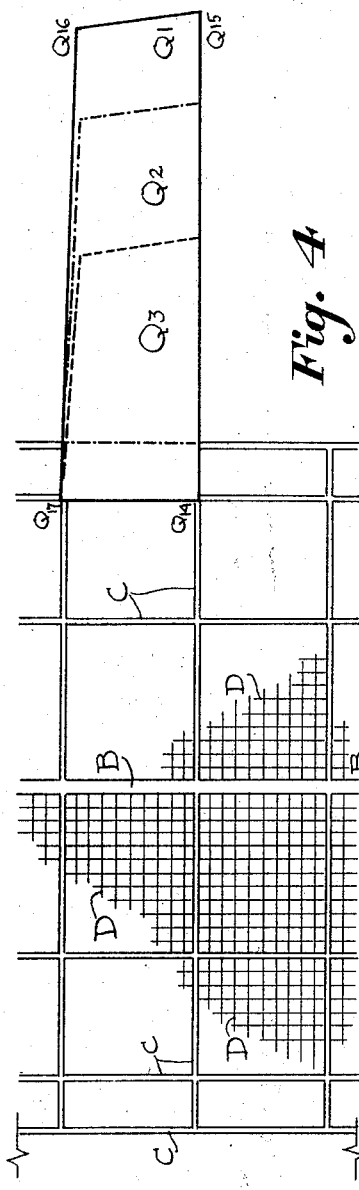
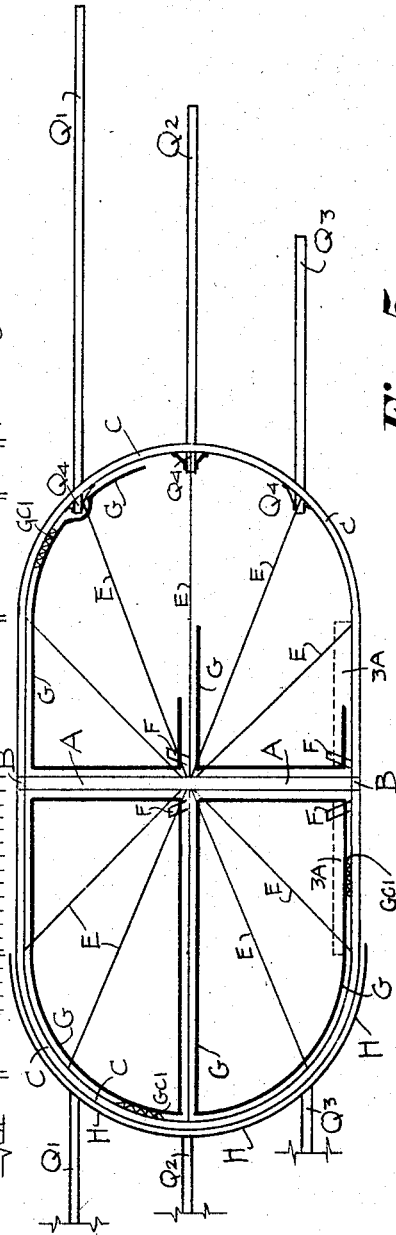
Frank Bauer, Inventor

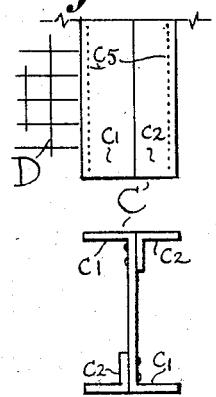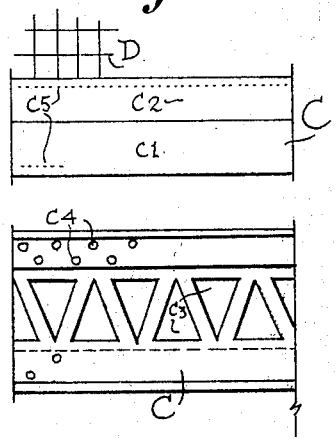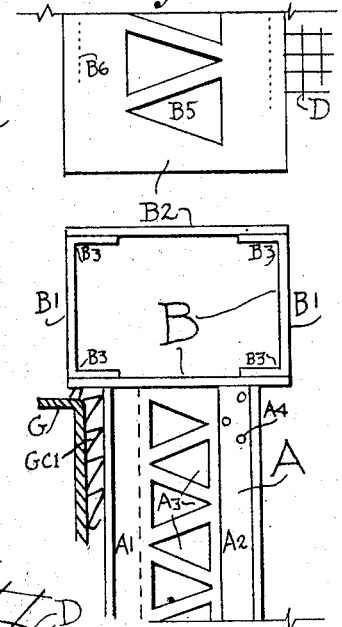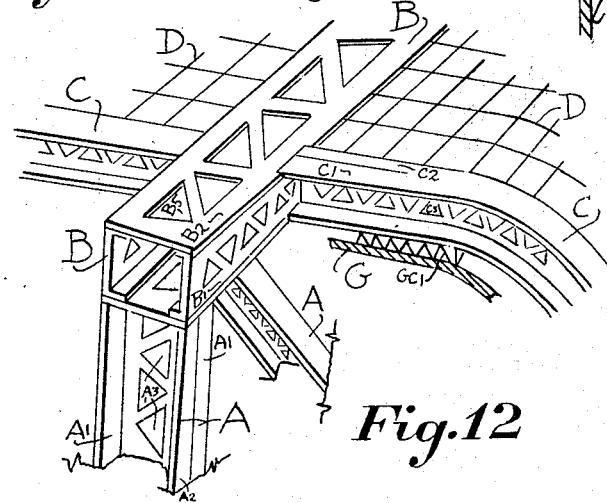

June 14, 1927.　　　　　　　　　　　　　　　　　　1,632,641
F. BAUER
RIGID AIRCRAFT
Filed Jan. 2, 1926　　　　　5 Sheets-Sheet 4

Inventor
Frank Bauer

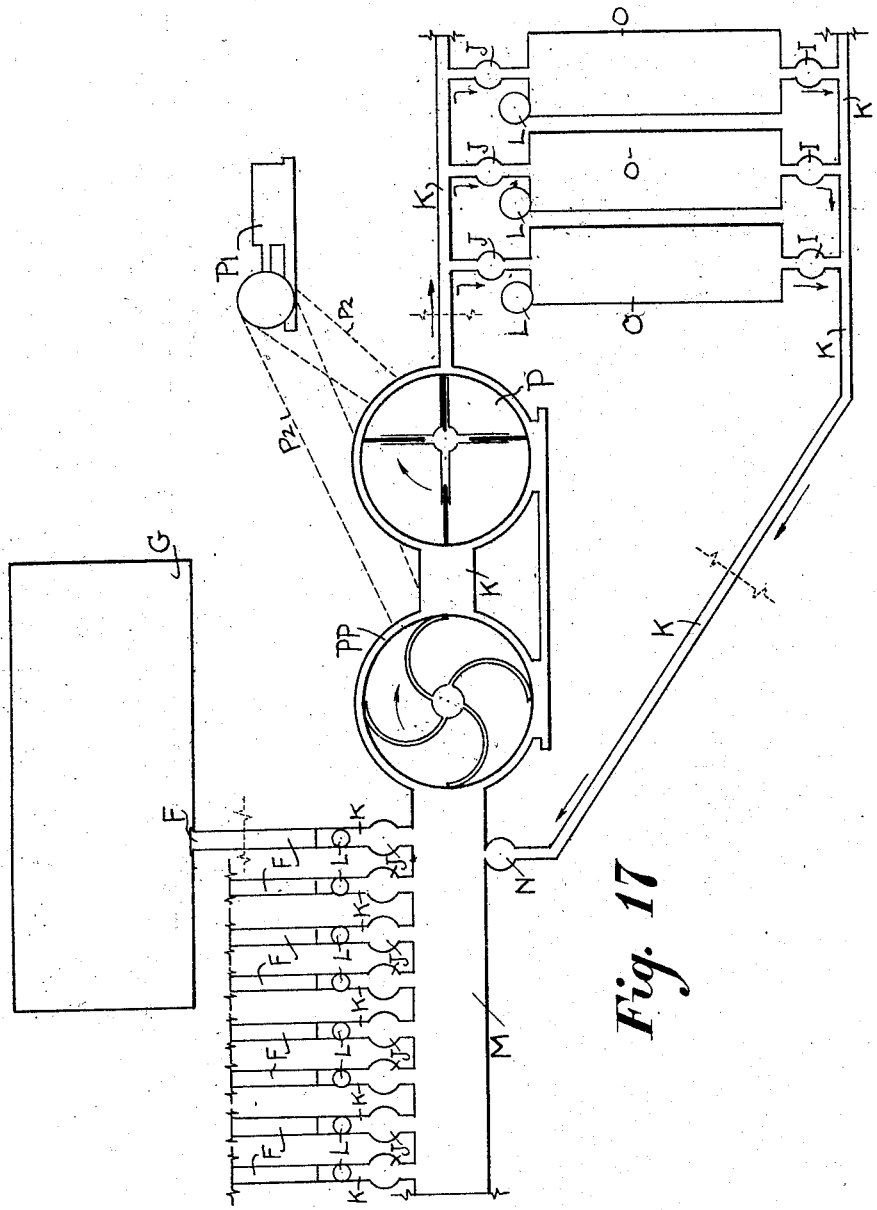

Patented June 14, 1927.

1,632,641

UNITED STATES PATENT OFFICE.

FRANK BAUER, OF WILLIAMSVILLE, NEW YORK.

RIGID AIRCRAFT.

Application filed January 2, 1926. Serial No. 78,852.

My invention relates to improvements in rigid aircrafts and my objects being:—

First, that this rigid aircraft is a combination airship and a airplane.

Second, that it is completely built of metal (that is, the hull, planes and cars, but not the gas-cells, etc.).

Third, that the special contour and shape of this rigid aircraft, the hull (body) is nine times longer than its height, twice as wide as its height, its width and height tapering and curving at the after end, the tapering beginning about one third of aircraft's length from the stern end, it has a round flattish bow; this contour being intensified by the addition of twenty specially shaped planes (wings) fastened to the hull at specified locations.

Fourth, that there is a special metal backbone construction through this rigid aircraft from bow to stern composed of vertical and diagonal girders fastened to upper and lower horizontal boxbeams.

Fifth, that from this backbone, (that is from the boxbeam part) smaller rib girders run vertically and horizontally to form the frame-work and contour of this rigid aircraft, also that between these smaller rib girders there are wires, attached to the ribs and to one another helping form the framework.

Sixth, that there is a thin sheet metal outside covering fastened on to this aircraft's frame-work.

Seventh, that this aircraft's frame-work is to be kept tightened and taut in a special manner by the use of metal cables, placed at intervals inside the hull, and tightened and fastened to the framework with turnbuckles.

Eighth, that the boxbeams and all girders are of a special design and construction and that they are of metal.

Ninth, that twenty planes (wings) are fastened in their proper location to the hull.

Tenth, that these planes (wings) are of a special design and construction and are entirely built of metal.

Eleventh, that there is a special method in which the planes (wings) are fastened to the hull of this rigid aircraft.

Twelfth, that there is a special system of maneuvering and balancing (trimming) this rigid aircraft by a controlled method of emptying and filling of the gas-cells and compressed-gas storage tanks with the use of centrifugal compressors (pumps).

Thirteenth, that there is a special arrangement of mechanisms to attain this system of maneuvering and balancing this rigid aircraft.

Fourteenth, that there is a special arrangement for the twenty-four gas-cells throughout the hull of this rigid aircraft.

Fifteenth, that there is a special arrangement, which is that of fastening the main car on tight and flush against the top of the aircraft's hull and that the power and control cars are fastened flush against the bottom of the hull.

I attain these objects by the mechanisms, constructions and arrangements illustrated in the accompanying drawings, in which:—

Fig. 1 is a plan drawing of the entire rigid aircraft.

Fig. 2 is a side elevation view of the entire rigid aircraft.

Fig. 3 is an elevation showing a cross section through the center of the aircraft.

Fig. 4 is a plan section of the hull and planes.

Fig. 5 is an elevation section of the hull and planes.

Fig. 6 and Fig. 8 are plan views of the rib girders.

Fig. 7 is a cross section elevation of a rib girder.

Fig. 9 is a side elevation of a rib girder.

Fig. 10 is a plan view of a boxbeam.

Fig. 11, upper part shows a cross section of a boxbeam and lower part shows a side elevation view of a vertical and diagonal girder.

Fig. 12 shows a section of the aircraft, in perspective.

Figure 13:
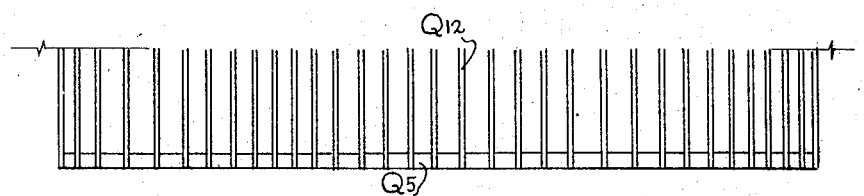

Fig. 13 shows a plan section view of a plane or wing.

Figure 14:
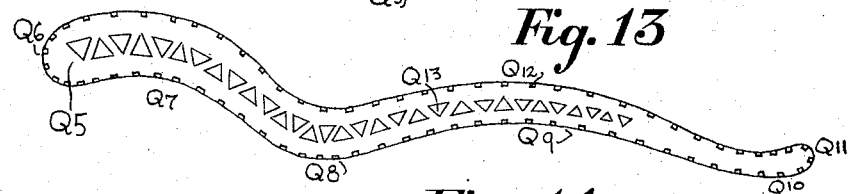

Fig. 14 shows a side elevation of a plane's (wing) rib.

Figure 15:
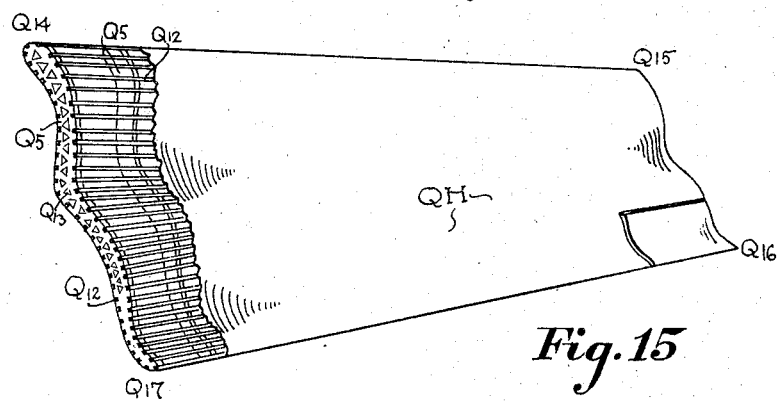

Fig. 15 shows a perspective drawing of an entire plane (or wing).

Figure 16:
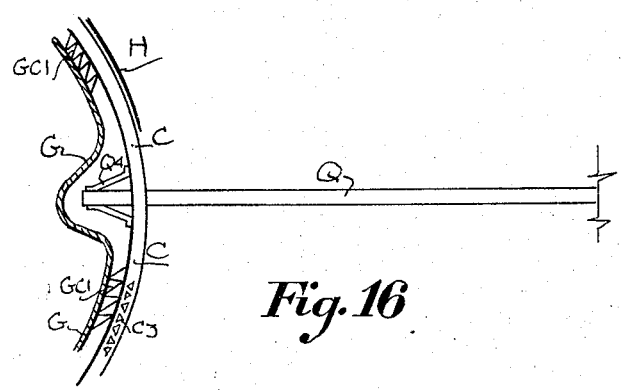

Fig. 16 shows an elevation section of plane and rib girder.

Fig. 17 shows the special system of arranging the mechanisms that are used for maneuvering and balancing (trimming) this rigid aircraft.

Similar letters and numerals refer to similar parts throughout the various drawings.

The contour and shape of this rigid aircraft through the construction of the framework of the hull with the addition of the planes (wings) is acquired as follows:

Regarding the hull in making up the contour and shape of this rigid aircraft:

A the vertical and diagonal girders running the height of the aircraft are fastened by welding and riveting to B the boxbeams and these A girders and B boxbeams form the metal backbone of this aircraft. This backbone runs the entire length of the aircraft and its outlines which show the contour and shape of this aircraft in elevation, run from the bow which is curved in a half circle and is shown in $X^1$ in Fig. 2, elevation, continues slanting upward as $X^2$ it meets $X^3$ which designates the horizontal line of the aircraft's top, then it slants downward gradually as $X^4$ until it develops into the point of the stern S, here it turns and runs slanting as $X^4$ to $X^3$ the bottom horizontal line, then it slants upward again as $X^2$ to meet the curved bow $^1$. This elevation outline of this aircraft just described is formed by the boxbeams B.

Running from the boxbeams B, to which they are fastened by welding and riveting and going around the aircraft vertically and horizontally and intersecting and fastened to one another are the metal rib-girders C which help form the framework as shown by Fig. 1 plan and Fig. 2, elevation, and these rib-girders help form the plan contour and shape of this aircraft by the outlines being formed by them as shown by the lines $X^1$, $X^3$, $X^4$ and stern point S on Fig. 1. The contour and shape of the aircraft by these rib-girders C shown in cross section through the center of the aircraft is shown in Fig. 3 by the lines $X^3$. These rib-girders C are fastened to the boxbeams B and to one another by welding and riveting and they are so spaced in this aircraft's framework so as to give the maximum utility and serviceableness. Also the A vertical and diagonal girders which are fastened to the upper and lower boxbeams B are so spaced in the backbone of this aircraft so as to give the maximum utility and serviceableness. D are the wires fastened to the rib-girders C and to the boxbeams B and to one another at right angles and these wires D help form the framework. The outside thin sheet metal covering H is fastened to the framework by riveting and welding, shown in Fig. 1, Fig. 2 and Fig. 5. Throughout the inside of this aircraft's framework and spaced at the proper intervals are the metal cables E shown in Fig. 3 and Fig. 5, these cables are fastened to the framework with turnbuckles and these cables E are used to tighten and brace and to keep taut the metal framework. Fig. 4, plan, Fig. 5 elevation section and Fig. 12 perspective section, show the letters and numerals designating the various constructions of the framework in greater detail.

The contour and shape of this aircraft's hull is acquired by the above construction methods and formations and this contour and shape of the hull is as follows:—It is nine times longer than its height, twice as wide as its height, its width and height tapering and curving to a point at the stern end, the tapering beginning about one third of the aircraft's length from the stern end; it has a round flattish bow. The contour and shape of this aircraft is exactly as illustrated in Fig. 1, Fig. 2 and Fig. 3 which show the curved, horizontal, vertical, slanting and all other lines in plan, elevation and cross-section views, that give the hull its contour and shape. Again, the designations $X^1$, $X^2$, $X^3$, $X^4$, S (and some other numerals and letters not yet mentioned such as those for the cars, fins, rudders, etc.) on the accompanying drawings, show the locations of these various line shapes and outlines that make up the contour of the hull.

Regarding the planes (wings) that help make up the contour and shape of this rigid aircraft:—

There are twenty specially designed metal planes Q which add to the contour and shape of this aircraft and these planes Q are fastened to the hull and they are placed at the locations marked Z and $Z^1$ on the drawings showing the hull and planes. The contour and shape of these metal planes Q are illustrated in Fig. 1, Fig. 14 and Fig. 15; the plan outline of such a plane Q is shown in Fig. 1, (and Fig. 15,) starting at a point $Q^{14}$ it is shown as a straight line that runs to $Q^{15}$ then diagonally in to $Q^{16}$ thence in a straight line to $Q^{17}$, thence running at right angles to $Q^{14}$. The concave and convex curves of these planes located in the width and height of each plane are shown in Fig. 14 by $Q^6$, $Q^7$, $Q^8$, $Q^9$, $Q^{10}$ and $Q^{11}$ and run the full length of the plane. These metal planes are put on the hull in tri-plane effect and are arranged so that the longest plane $Q^1$ is on top; the next plane below is $Q^2$ which is shorter than the first; the lowest plane is $Q^3$ which is the shortest of the three. There are six sets of these metal planes located on the hull, viz: three sets on each side; each plane is located at the place marked Z on the hull as shown in the drawings. Also between the last set of tri-planes and the point of the stern, on each side of the aircraft is a single metal plane the same size and shape as the planes $Q^2$. These last two planes are located on the hull at $Z^1$. All the metal planes Q are welded and braced to the rib girders C of the hull in the special manner shown in Fig. 5, designated Q⁴.

The drawings and descriptions showing the number, shape and locations of these planes, added to the shape of the hull, complete the outlines of the contour and shape of the entire rigid aircraft. Added to this of course are the outlines that compose the passenger, power and control cars designated as 1, 1ᴬ and the rudders and fins designated as 2.

The special design and construction in metal of the boxbeams B, and the vertical and diagonal girders A and the rib girders C are acquired in this manner:—

Regarding the special design:

The special triangular design is die-stamped or otherwise machined out of the boxbeams and girder metal pieces so as to make them lighter but still keeping their strength intact, is shown in Fig. 9 and Fig. 12 and designated as C³ for the rib girders and in Fig. 10 and Fig. 12 designated B⁵ for the boxbeams. All four sides (plates) of the boxbeams have this triangular design die-stamped or otherwise machined out of them. This triangular cut-out design is also shown in Fig. 11 and Fig. 12 and is designated as A³ for the vertical and diagonal girders A.

Regarding the special construction of these metal rib girders, vertical and diagonal girders and boxbeams, these are constructed as follows:—

For the metal ribs C which are formed of three pieces riveted together; the main piece of the rib girder has each end bent, as shown in Fig. 7 designated as C¹ and on to this main piece are riveted the bent pieces shown as C². Fig. 9 designated by C⁴ shows how these metal pieces are riveted. The edges of the bent pieces of the rib girder are perforated with small holes which are shown in the plan views, Fig. 6 and Fig. 8 and are designated as C⁵. These holes are used for fastening the wires D on the outside of the pieces and on the inside of the pieces for attaching the wires or toggle-lines GC¹, (see Fig. 5, Fig. 11, Fig. 12 and Fig. 16) which fasten the gas-cells (ballonets) G onto the framework. The same procedure of construction is followed when constructing the vertical and diagonal girders A (see lower part of Fig. 11 and parts marked A¹, A², and A⁴). For the metal boxbeams B which are formed of four pieces riveted together as shown in the upper part of Fig. 11 viz: the two vertical pieces, which are the two side pieces marked B¹ are bent in at the ends, designated B³ and onto these bent parts B³, are riveted the two horizontal pieces marked B² which form the top and bottom parts of the boxbeams. These upper and lower pieces B² are perforated with holes B⁶ so that the wires D and the smaller wires or toggle-lines GC¹ can be fastened onto the boxbeams B through these holes B⁶.

These special constructions of the boxbeams B, vertical and diagonal girders A and the rib girders C are welded and riveted together at their proper locations to form the metal framework of this rigid aircraft.

The construction and special design regarding the contour of the twenty (20) planes (wings) Q are acquired in this manner:—

The contour and shape of these planes Q has already been described elsewhere in this specification.

Regarding the construction of one of these planes Q, a die-stamped rib Q⁵ is placed at each end of the plane (wing) and at the necessary intervening spaces between; on to these ribs are fastened the long thin metal square-edged pieces Q¹² exactly as shown by the drawings Fig. 13, Fig. 14 and Fig. 15. Each rib Q⁵ has the same special triangular design Q¹³ die-stamped or machined out of them as the vertical and diagonal girders, boxbeams and rib girders have. Each plane rib Q⁵ has its entire outside outline edge notched as shown in Fig. 14 so that the long thin metal square-edged pieces Q¹² fit into these notches.

Over the framework consisting of the metal plane (wing) ribs Q⁵ and the long thin metal square-edged pieces Q¹², is fastened by riveting and welding and soldering, the outside thin sheet metal covering QH.

The special manner in which the twenty (20) planes are fastened to the hull is exactly as shown on the drawing in Fig. 16, designated Q⁴. This shows the plane (wing) protruding inside the hull ribs so that the upper and lower metal braces can be fastened to the plane Q and onto the hull ribs C. Additional rib girders C are placed on this aircraft's framework wherever necessary so that there will be substantial surfaces on which to fasten the planes (wings) Q.

In this rigid aircraft there are twenty-four (24) gas cell envelopes (ballonets or bags) made of a rubberized fabric material and lined with gold-beater's skin or its equivalent. Each cell-bag is shaped in such a manner that it will fit snugly in its specified place inside the framework when expanded with gas. These cells are arranged in pairs, twelve pairs on each side of the back-bone girders throughout the entire length of this aircraft. See sections of them designated G, on Fig. 1, Fig. 2, Fig. 3, Fig. 5, Fig. 11, Fig. 12 and Fig. 17. The size and shape of these gas-cells (ballonets or bags) is governed by the outline shape of this aircraft in regard to their width and height. In length the cells are all equal. These gas-cells are fastened to the inside of the framework with toggle-ropes or wires, GC¹. The end of the toggle-rope or wire that is fastened to the gas-cell is divided into several strands and cemented to the gas-bag in crossfoot effect. The other end of the toggle-rope or wire, GC¹ is fastened to the aircraft's framework through the small holes that perforate the girders and boxbeams.

The method to accomplish the manipulation of filling and emptying of the gas-cells, G, and the compressed-gas-storage tanks, O, so as to maneuver and balance (trimming) this rigid aircraft is as follows, First, for filling gas-cells G:—(see Fig. 17).

Close globe valves J between rotary (centrifugal) gas compressor P and compressed-gas-storage tanks O; open diaphragm valves I, pressure dial L is to be considered for regulation of pressure; open needle valve N between storage tanks O and manifold pipe M; open globe valves J between manifold pipe M and flexible connecting gas-cell pipes F; the gas then flows at a pressure that may be regulated from the compressed-gas-storage tanks O through the gas-pipe (lines) K and all the other mentioned valves and pipes into the gas-cells G. The gas pipes and valves between the manifold pipe and the gas-cells may be opened and closed so that only certain gas-cells, either right side or left of this aircraft, either above or below, either front, middle or back gas-cells may be filled as desired.

Second, for emptying gas-cells G:—(see Fig. 17).

Close needle valve N; close diaphragm valves I; open globe valve J between rotary (centrifugal) gas compressor P and gas-storage-tanks O. The globe valves J (of the cells that are to be emptied) between the manifold pipe M and the flexible pipes F must be open. Start and regulate the rotary compressor P and the rotary blower PP which blows the gas into the rotary compressor from the gas-cells. This rotary blower PP may be eliminated from this system. The rotary compressor P will receive the gas from the rotary blower, compress it, and then pump it through the gas pipes K and globe valves J, into the compressed-gas-storage tanks O. The rotary blower and rotary compressor may be regulated to move and compress as large a volume of gas as desired. The power to rotate the gas-blower PP and gas-compressor P is supplied by an auxiliary engine or motor P¹. P² shows the belt drive from the auxiliary engine or motor to the rotary blower and rotary compressor. One or many gas-cells may be emptied as desired just by adjusting the valves.

The various mechanisms, constructions and arrangements that comprise this system of maneuvering and balancing (trimming) this rigid aircraft by a controlled method of emptying the gas-cells (bags or ballonets) and compressed-gas-storage-tanks with the use of rotary compressor and blower, may be located in the most appropriate places (positions) in the control and power cars and inside this aircraft's hull on the passageways alongside the bottom of this aircraft's metal backbone so that this system may be used as efficiently as possible.

The main car which is to be used for carrying passengers, freight and other articles is firmly fastened flush to the boxbeams and rib girders and metal hull covering by riveting onto the top of this aircraft's hull and is designated in the drawings as 1 in Fig. 1, Fig. 2, and Fig. 3. It is to be constructed of metal.

The control and power cars are to be used for housing the officers and crew, the controlled system of maneuvering and balancing (trimming) the aircraft, the propelling engines and motors, wireless, the charts and all aeronautical instruments; these cars are designated in the drawings as 1ᴬ in Fig. 2 and Fig. 3. These cars are also to be built of metal and are riveted to the boxbeams, and girders, etc., by riveting flush onto the bottom of this aircraft's hull. All cars fit flush to this aircraft's hull.

The passageway which is designated as 3 in Fig. 2 is a vertical one and leads from main car 1 to the horizontal passageways 3ᴬ on the bottom of this aircraft's hull. This passageway 3 is a cylindrical metal one and persons may go from car 1 to the bottom passageways 3ᴬ, or vice versa, by means of an elevator or stairway or ladder.

The passageways on the bottom of the hull are horizontal ones and are designated as 3ᴬ in Fig. 2 and Fig. 3. These passageways 3ᴬ run the full length of the bottom of the hull on either side of the aircraft's metal backbone. From this long passageway smaller passageways lead to the control and power cars 1ᴬ.

Along the main passageways 3ᴬ are also placed fuel and water tanks also some trimming ballast tanks.

The stabilizing fins and rudders used to steady and guide (steer) this aircraft are designated as 2 in Fig. 1 and Fig. 2.

Items such as safety valves, a properly constructed bow or nose so that this aircraft can be fastened to a mooring mast, and all other necessary appliances that go with rigid aircrafts of modern type, but are not claimed in my invention, are or may be used on this rigid aircraft.

I am aware that prior to my invention, rigid airships have been made and flown, especially those originated by the Germans. But these German designed types have proved their fragility and unsuccessfulness by their many disasters. However, due credit must be given these German types for they are the pioneers in the modern era of rigid airship building and flying. My invention will eliminate this fragility heretofore shown in rigid aircrafts as I have combined the principal features of both the rigid airship type and airplane type by using new original ideas in designing a safe and absolute airworthy rigid aircraft. My modern system of a controlled method of maneuvering and balancing (trimming), this rigid aircraft in emptying and filling the gas-cells (bags or ballonets) and compressed-gas-storage tanks by rotary compressor and blower is an innovation in safetiness when guiding and maneuvering (assisted by the propelling engines or motors) an aircraft when on a trip or journey as it offsets the expansion, etc., of the lifting gases when encountering various climatic changes and conditions. Rigid aircraft built and flown in accordance with my invention will be the great step forward in aeronautics:

Having thus described my invention, I claim:—

1. In a rigid aircraft, a framework consisting of upper and lower box beams and girders fastened to and connecting said box beams, part of said girders extending perpendicular to said box beams and others extending diagonally to said box beams.

2. In a rigid aircraft, a framework consisting of upper and lower boxbeams, backbone girders disposed between said boxbeams, rib girders extending from the boxbeams to provide a body, and a plurality of wires radiating from the backbone girders to the rib girders to hold the framework assembled.

3. In a rigid aircraft, a framework consisting of upper and lower boxbeams, backbone girders disposed between said boxbeams, rib girders extending from the boxbeams to provide a body, a plurality of wires radiating from the backbone girders to the rib girders to hold the framework assembled, and a metal covering enveloping the framework.

4. In a rigid aircraft, a framework consisting of upper and lower boxbeams, backbone girders interposed to space said boxbeams, rib girders extending from the boxbeams to provide an elliptical shaped body, and tensioning cables radiating from the center of the backbone girders to the rib girders to hold said girders and boxbeams assembled.

5. An aircraft body comprising upper and lower boxbeams, backbone and rib girders attached to said boxbeams to provide an elliptical shaped body, and a plurality of gas chambers provided in the body, said chambers being arranged in a plurality of pairs with a chamber of each pair disposed on opposite sides of the boxbeams.

6. In a rigid aircraft an aerostat comprising upper and lower boxbeams, vertically and diagonally backbone girders disposed between said boxbeams, and longitudinal and transverse partitions for providing a plurality of pairs of chambers, one of each pair of chambers being disposed on opposite sides of the boxbeams.

7. An aerostat framework in cross section composed of upper and lower boxbeams, backbone girders between said boxbeams, and rib girders provided with arc portions terminating in relatively long straight extensions, said rib girders being diametrically attached to the boxbeams with the arc portions forming the sides and the extensions forming relatively long flat surfaces for the top and bottom of said framework.

8. In a rigid aircraft a framework consisting of upper and lower boxbeams, backbone girders disposed between said boxbeams, rib girders extending from the boxbeams to provide a body and a plurality of gas chambers within the body, said chambers being arranged in a plurality of pairs with a chamber of each pair disposed on opposite sides of the boxbeams to provide an aerostat, and a plurality of planes oppositely disposed on the sides of the aerostat.

9. In a a rigid aircraft a framework consisting of upper and lower boxbeams, backbone girders disposed between said boxbeams, rib girders extending from the boxbeams to provide a body and a plurality of gas chambers within the body, said chambers being arranged in a plurality of pairs with a chamber of each pair disposed on opposite sides of the boxbeams to provide an aerostat, and a plurality of planes of unequal length disposed oppositely on the sides of the aerostat.

10. In a rigid aircraft a framework consisting of upper and lower boxbeams, backbone girders disposed between said boxbeams, rib girders extending from the boxbeams to provide a body and a plurality of gas chambers within the body, said chambers being arranged in a plurality of pairs with a chamber of each pair disposed on opposite sides of the boxbeams to provide an aerostat, and a plurality of planes progressively increasing in length from bottom to top being oppositely disposed on the sides of the aerostat.

In testimony whereof, I affix my signature.

FRANK BAUER.